US011089118B1

(12) United States Patent
Bruckart et al.

(10) Patent No.: US 11,089,118 B1
(45) Date of Patent: Aug. 10, 2021

(54) INTERLOCK FOR MESH NETWORK

(71) Applicants: Robert C. Bruckart, Melbourne, FL (US); Timothy J. Atkinson, Melbourne, FL (US); Don W. Bebout, Melbourne, FL (US)

(72) Inventors: Robert C. Bruckart, Melbourne, FL (US); Timothy J. Atkinson, Melbourne, FL (US); Don W. Bebout, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/905,964

(22) Filed: Jun. 19, 2020

(51) Int. Cl.
H04L 29/08 (2006.01)
G06F 9/54 (2006.01)
H04L 29/06 (2006.01)

(52) U.S. Cl.
CPC .............. H04L 67/16 (2013.01); G06F 9/542 (2013.01); H04L 67/12 (2013.01); H04L 69/16 (2013.01)

(58) Field of Classification Search
CPC ......... H04L 67/16; H04L 67/12; H04L 69/16; G06F 9/542
See application file for complete search history.

(56) References Cited

U.S. PATENT DOCUMENTS

| 6,038,031 | A | 3/2000 | Murphy |
| 7,136,927 | B2 | 11/2006 | Traversat et al. |
| 7,623,516 | B2 | 11/2009 | Chaturvedi et al. |
| 7,996,765 | B1 | 8/2011 | Mitnick et al. |
| 10,805,146 | B2 | 10/2020 | Bruckart et al. |
| 2003/0214508 | A1 | 11/2003 | Aleksic et al. |
| 2006/0265659 | A1 | 11/2006 | Collins et al. |
| 2007/0132779 | A1 | 6/2007 | Gilbert et al. |
| 2007/0237089 | A1 | 10/2007 | Chen et al. |
| 2008/0009968 | A1 | 1/2008 | Bruemmer et al. |
| 2008/0091365 | A1 | 4/2008 | Tsang et al. |

(Continued)

OTHER PUBLICATIONS

Non Final Office Action for U.S. Appl. No. 15/946,180 dated Sep. 16, 2020.

(Continued)

Primary Examiner — Philip J Chea
Assistant Examiner — Hassan A Khan
(74) Attorney, Agent, or Firm — Tarolli, Sundheim, Covell & Tummino LLP

(57) ABSTRACT

A system for establishing a mesh network that includes a plurality of nodes of the mesh network, wherein each of the plurality of nodes executes on one or more computing platforms. In response to coming online, each of the plurality of nodes executes an interlock that calculates a grace period for a service executed by a respective software application executing on a respective node of the plurality of nodes. The calculation is based on a previous number of services and topics communicated on the mesh network. The interlock can also reset the grace period in response to detecting a particular network event wherein the interlock prevents the service of the respective software application from communicating messages on the mesh network during a running of the grace period. The interlock can permit, in response to expiration of the grace period, the service of the respective software application to communicate messages.

20 Claims, 16 Drawing Sheets

(56) References Cited

U.S. PATENT DOCUMENTS

| | | |
|---|---|---|
| 2009/0204633 A1 | 8/2009 | Bender et al. |
| 2010/0168874 A1 | 7/2010 | Lucas et al. |
| 2010/0232317 A1 | 9/2010 | Jing et al. |
| 2011/0216059 A1 | 9/2011 | Espiritu et al. |
| 2012/0131279 A1 | 5/2012 | Ciraula et al. |
| 2012/0238361 A1 | 9/2012 | Janis et al. |
| 2012/0254874 A1 | 10/2012 | Siira et al. |
| 2013/0011076 A1 | 1/2013 | Obzhirov |
| 2014/0033026 A1 | 1/2014 | Sheridan et al. |
| 2015/0227270 A1 | 8/2015 | Yun et al. |
| 2015/0264554 A1* | 9/2015 | Addepalli ............... H04W 8/26 370/328 |
| 2015/0347108 A1 | 12/2015 | Munshi et al. |
| 2016/0104204 A1 | 4/2016 | Greenberg et al. |
| 2016/0216072 A1 | 7/2016 | McNeil et al. |
| 2016/0253908 A1 | 9/2016 | Chambers et al. |
| 2017/0195458 A1 | 7/2017 | Parekh et al. |
| 2018/0105271 A1* | 4/2018 | Wypyszynski ....... B64C 39/024 |
| 2018/0188747 A1 | 7/2018 | Venturelli |
| 2018/0212863 A1* | 7/2018 | Akcan ................ H04W 40/246 |
| 2019/0246289 A1* | 8/2019 | Monga ................. H04W 8/005 |
| 2019/0349426 A1* | 11/2019 | Smith ................. G06F 16/1824 |
| 2020/0235987 A1* | 7/2020 | Bruckart ................. H04L 67/12 |

OTHER PUBLICATIONS

Final Office Action for U.S. Appl. No. 16/178,345 dated Aug. 21, 2020.

Final Office Action for U.S. Appl. No. 15/901,486 dated Jan. 28, 2021.

Final Office Action for U.S. Appl. No. 15/946,180 dated Mar. 16, 2021.

\* cited by examiner

INTERLOCK FOR MESH NETWORK

TECHNICAL FIELD

This disclosure relates to a system and method for executing an interlock that implements a grace period for communicating messages on a mesh network.

BACKGROUND

A computing platform or digital platform refers to the environment in which a piece of software is executed. A computing platform may be the hardware or the operating system (OS), even a web browser and associated application programming interfaces, or other underlying software, as long as the program code is executed with it. Computing platforms have different abstraction levels, including a computer architecture, an OS, or runtime libraries. A computing platform is the stage on which computer programs can run.

Middleware is computer software that provides services to software applications beyond those available from the operating system. Middleware can be described as "software glue". Middleware makes it easier for software developers to implement communication and input/output. The term middleware commonly refers to software that enables communication and management of data in distributed applications. As one definition, middleware is "those services found above the transport (e.g., over TCP/IP) layer set of services but below the application environment" (e.g., below application-level APIs). In this more specific sense middleware can be described as the dash ("-") in client-server, or the -to- in peer-to-peer. Middleware includes web servers, application servers, content management systems, and similar tools that support application development and delivery.

In software architecture, publish-subscribe is a messaging pattern where senders of messages, called publishers, do not program the messages to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are. Publish-subscribe is a sibling of the message queue paradigm, and is typically one part of a larger message-oriented middleware system. Some messaging systems support both the publish/subscribe and message queue models in an associated application programming interface (API), e.g. Java Message Service (JMS).

In the publish-subscribe model, subscribers may receive only a subset of the total messages published. The process of selecting messages for reception and processing is called filtering. There are two common forms of filtering: topic-based and content-based. In a topic-based system, messages are published to "topics" or named logical channels. Subscribers in a topic-based system will receive all messages published to the topics to which they subscribe. The publisher is responsible for defining the topics to which subscribers can subscribe. In a content-based system, messages are only delivered to a subscriber if the attributes or content of those messages matches constraints defined by the subscriber. The subscriber is responsible for classifying the messages. Some systems support a hybrid of the two, wherein publishers post messages to a topic while subscribers register content-based subscriptions to one or more topics.

SUMMARY

One example relates to a system for establishing a mesh network. The mesh network can include a plurality of nodes of the mesh network. Each of the plurality of nodes executes on one or more computing platforms, In response to coming online each of the plurality of nodes executes an interlock. The interlock calculates a grace period for a service executed by a respective software application executing on a respective node of the plurality of nodes, wherein the calculation is based on a previous number of services and topics communicated on the mesh network. The interlock also resets the grace period in response to detecting a particular network event wherein the interlock prevents the service of the respective software application from communicating messages on the mesh network during a running of the grace period. The interlock permits, in response to expiration of the grace period, the service of the respective software application to communicate messages on the mesh network.

Another example relates to a computing platform. The computing platform can include a given node executing on the computing platform, wherein the given node communicates on a mesh network, and in response to coming online, the given node executes an interlock. The interlock can calculate a grace period for a given service of a given software application executing on the given node, wherein the calculation is based on a previous number of services and topics that the given service communicated with on the mesh network. The interlock can also reset the grace period in response to detecting a particular network event wherein the interlock prevents a service of the given software application from communicating messages on the mesh network during the grace period. Additionally, the interlock can permit, in response to expiration of the grace period, the service of the respective software application to communicate messages on the mesh network.

Yet another example relates to a method for establishing a mesh network. The method can include initiating, at a given node of a mesh network, execution of an interlock. The method can also include calculating, by the interlock, a grace period for a given service of a software application executing on the given node, wherein the calculating is based on a number of services and topics that communicate on the mesh network. The method can further include detecting, at the interlock of the first node, a particular network event on the mesh network. The method can yet further include resetting, at the interlock of the first node, the grace period in response to the detecting and preventing, by the interlock of the first node, the given service of the software application from communicating on the mesh network in response to the resetting. Still further, the method can include permitting, by the interlock of the first node, the service of the software application to communicate on the mesh network in response to expiration of the grace period.

DETAILED DESCRIPTION

The present disclosure relates to one or more computing platforms that establish a mesh network. The mesh network can be formed with a plurality of nodes executing on the one or more computing platforms. Each node can execute an interlock and a runtime environment for a software application that executes a service (or multiple services). The interlock executing on a given node of the plurality of nodes can be programmed to calculate a grace period for a given service of a given software application executing on the given node. The calculation is based on a previous number of services and topics that the given service communicated with on the mesh network.

The interlock can be programmed to reset the grace period for the given service in response to detecting a particular network event wherein the interlock prevents a service of the given software application from communicating messages on the mesh network during the grace period. Additionally, the interlock can be programmed to permit the given service of the respective software application to communicate messages on the mesh network after expiration of the grace period.

In some examples, the particular network event that triggers the reset (including a first run) of the grace period by the interlock could be, for example, the interlock detecting that the given service has come online. Additionally or alternatively, the particular network event could be the interlock detecting another service coming online or going offline.

Figure 1:
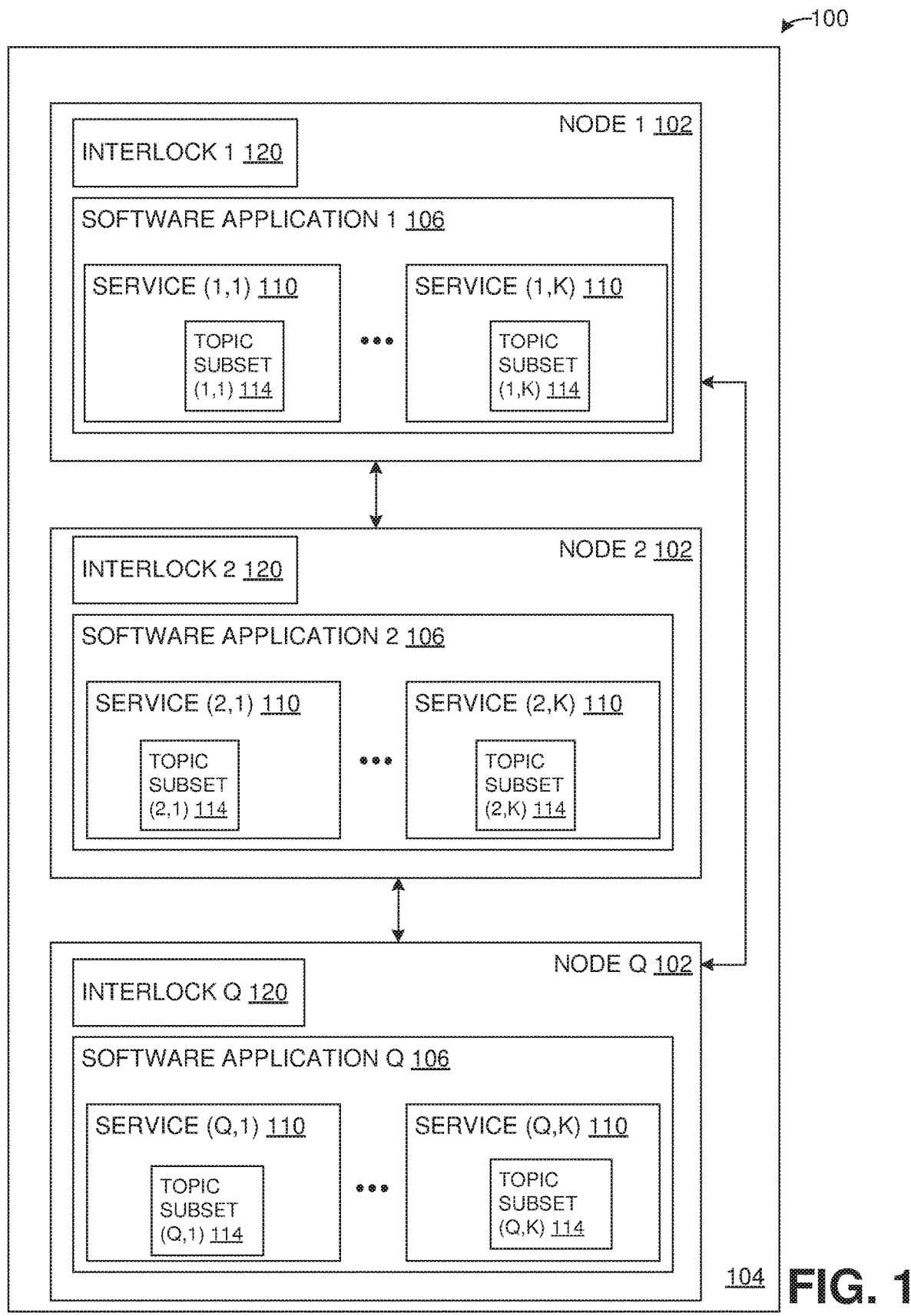
FIG. 1 illustrates an example of a system for controlling communications on a mesh network.

FIG. 1 illustrates an example of a system 100 for establishing and maintaining a peer-to-peer (e.g., serverless) mesh network of Q number of nodes 102, where Q is an integer greater than or equal to two. The Q number of nodes 102 can be representative of middleware software services (e.g., an application) that execute on a computing platform 104. Although FIG. 1 illustrates one computing platform 104, it is understood that there could be multiple computing platforms. As one example, the system 100 could be implemented on an aircraft, wherein each of the Q number of nodes 102 represent different middleware services for controlling a different portion of the aircraft.

Each of the nodes 102 can provide an isolated runtime environment for a software application 106 executing thereon. In some examples, each of the Q number of nodes 102 can communicate with a standard communications protocol such as a communication protocol within the Transmission Control Protocol Internet Protocol (TCIP/IP) stack. More specifically, in some examples, the nodes 102 can communicate via the Transmission Control Protocol (TCP) or the User Datagram Protocol (UDP).

The mesh network can employ a publish-subscribe messaging model where senders of messages, referred to as publishers, do not necessarily address messages on the mesh network to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are. In some examples, the mesh network can employ the Java Messaging Service (JMS) to support the publish-subscribe model.

Each software application 106 can provide K number of services 110, where K is an integer greater than or equal to one. Each software application 106 can provide the same or a different number of services 110. The K number of services 110 for each software application 106 can (in total) provide R number of topics communicated throughout the mesh network, where R is an integer greater than or equal to zero.

Each of the K number of services 110 for a given software application 106 can provide (e.g., publish and/or subscribe to) a topic subset 114 of the R number of topics on the mesh network. Each topic subset 114 has a subset of the R number of topics on the mesh network. More particularly each topic subset 114 can include every topic of the R number of topics, zero topics or a proper subset of the R number of topics. Further, it is understood that two different services 110 can provide the same or a different number of topics within the corresponding topic subset 114. In some examples, each of the R number of topics in the mesh network can refer to a named logical channel. In the present examples, subscribers (e.g., other services 110) of a particular topic of the R number of topics receive messages published to the particular topic. Thus, if two services 110 have the particular topic as a member in the associated topic subsets 114, the two services 110 have a communication channel on the mesh network. Further, it is understood that in some situations, different services 110 on the same software application 106 (operating on the same node 102) can communicate through the mesh network. Additionally, different services 110 operating on different software applications 106 (operating on different nodes 102) can also communicate through the mesh network.

For purposes of simplification of explanation, each service 110 and topic subset 114 include unique index numbers in FIG. 1. More particularly, each of the K number of services 110 for each software application 106 and each associated topic subset 114 includes a two-dimensional index number (i,j). In this situation, the first number, i identifies a software application 106 in which the service 110 and the topic subset 114 is being provided. The second number, j, indicates the number of the service 110 of a respective software application 106. As an example, the service 110 and the topic subset 114 in the Qth software application 106 (software application Q) is labeled and referred to as the service (Q,1) and topic subset (Q,1). Similarly, the Kth service 110 and the associated topic subset 114 in the first software application 106 (software application 1) is labeled and referred to as service (1,K) and topic subset (1,K). In this manner, each service 110 and topic subset 114 can be uniquely identified.

Each node 102 can also execute an interlock 120 that facilitates network communications between the corresponding software application 106 and the mesh network. Each interlock 120 can be configured to operate as a supervisor of the corresponding software application 106. In this manner, the interlock 120 can control permissions of services 110 of the corresponding software application 106 to communicate on the mesh network. That is, the interlock 120 of a corresponding node 102 can intermittently prevent or permit (allow) each of the K number of services 110 (or some subset thereof) on a corresponding software application 106 to communicate (e.g., publish) messages on the mesh network.

As used herein, the phrase "comes online" indicates that an associated entity has completed execution of a startup process. For example, the phrase "comes online" in reference to a given node 102 indicates that the given node 102 has completed a startup process (e.g., establishing a runtime environment) for an associated software application 106 and that an associated interlock 120 is executing thereon. Additionally, the phrase "comes online" in reference to a given service 110 indicates that the given service 110 has completed execution of a startup process and is ready to communicate with other services 110 on the mesh network. Similarly, the phrase "goes offline" indicates that an associated entity has been disabled (intentionally or unintentionally). More particularly, the term "goes offline" in reference to the given service 110, indicates that the given service 110 cannot communicate with other nodes on the mesh network.

Upon an initial startup of the computing platform 104, each of the Q number of nodes 102 are initiated. Moreover, in some examples, at least two of the Q nodes 102 and the associated software application 106 can come online (e.g., complete a startup process) in a nondeterministic order. Stated differently, in such examples, at least two of the nodes 102 complete an initial startup sequence in an unpredictable order. As an example, on a first startup of the computing platform 104, the second node 102 (node 2) may complete its startup process after the Qth node 102 (node Q) such that the Qth node 102 is online prior to the second node 102. Further, on a second startup of the computing platform, the second node 102 may complete its startup process before Qth node 102, such that the second node 102 is online prior to the Qth node 102. The sequence of starting each of the Q number of nodes 102 can be based, for example, on factors (e.g., network latency, operating system priorities and/or environmental factors) that may be outside of the control of the computing platform 104.

Additionally, the associated software applications 106 and corresponding services 110 also come online in a non-deterministic order that may or may not match the startup sequence of the nodes 102 (on which the corresponding software applications 106 execute). For instance, during one startup sequence of the computing platform 104, the first software application 106 (software application 1) operating on the first node 102 (node 1) may come online before the second software application 106 (the software application 2) of the second node 102 (node 2). Conversely, in another startup sequence, the first software application 106 operating on the first node 102 may come online after the second software application 106 operating on the second node 102, even in situations where the first node 102 comes online before the second node 102 (e.g., due to load times for the first software application 106 relative to the second software application 106).

Furthermore, services 110 spread throughout the mesh network can come online in a non-deterministic order. In one example, the K number of services 110 of a given software application 106 may come online in a non-deterministic order. For instance, service (1,1) and service (1,K) may come online in a non-deterministic order. Additionally, services 110 on different software applications 106 may come online in a non-deterministic order. For example, service (2,K) and service (Q,1) may come on-online in a non-deterministic order.

Due to the non-deterministic order that the nodes 102, the software applications 106 and services 110 come on-line, the interlock 120 of each corresponding node 102 can control the communication of messages by the services 110 to avoid having such messages becoming lost and/or needing to be resent. More particularly, each interlock 120 can calculate a grace period for each service 110 of a corresponding software application 106. Additionally, each interlock 120 can be configured to monitor network events, and in response to particular network events, each interlock 120 can reset the grace period. During the grace period, a given interlock 120 can prevent associated services 110 from communicating (e.g., publishing) messages on the mesh network until the grace period expires. After expiration of the grace period, the given interlock 120 can permit messages from the associated services 110 to be communicated on the mesh network. As some examples, the particular network event can include the interlock 120 detecting a service 110 has come online or gone offline.

In some examples, the interlocks 120 can operate on the application layer, such as the TCP/IP application layer and/or the application layer of the open system interconnect (OSI) reference model. That is, the interlocks 120 can specify which protocol (if any) is allowed to communicate on the mesh network. For example, the first interlock 120 (interlock 1) of the first node 102, can control the communication of network messages for the K number of services 110 of the first software application 106 (e.g., service (1,1) . . . service (1,K)).

The grace period for each service 110 can be based, for example, on a total number of services 110 throughout the mesh network, namely service (1,1) to service (Q,K) and the number of topics in each topic subset 114. More particularly, a given interlock 120 can calculate a grace period for a given service 110. As noted, there are R number of topics communicated by the services 110 on the mesh network. In such a situation, the given interlock 120 can define a set of services, S that are online at a current point in time. Additionally, the given interlock 120 can determine a set of topics, M needed for the given service 110. Moreover, for each service 110, in the S number of services, $T_i$ can represent the subset of topics a particular service in the S number of services. In the examples provided, it is presumed that there are up to n number of total services 110 on the mesh network, such that n is defined by Equation 1:

$$n=|\{\text{Service}(1,1) \ldots \text{Service}(Q,K)\}| \qquad \text{Equation 1:}$$

Wherein:

n is the cardinality of the set representing each service 110 of each software application 106.

The given interlock 120 can assign every service 110 (namely services (1,1). .. (N,K)) a unique single integer, i from 1 to n, such that the services 110 can be individually be referred to as $\text{service}_i$. For purposes of simplification of explanation, it is presumed that service (1,1) is assigned a single integer of 1 and service (Q,K) is assigned the single integer number of n (the last number). Thus, $\text{service}_i$ can refer to service (1,1) and servicer can refer to service (Q,K). Similarly, each topic subset 114 can be assigned the same single integer as the corresponding service 110, such that topic subset is the topic subset 114 of $\text{service}_i$. In other examples, other labeling schemas are possible.

The given interlock 120 can determine, M, which represents a set of topics for the given service 110 needed to communicate with each other service 110 on the mesh network. The given interlock 120 can also calculate D, which represents a set of times, $d_i$, wherein each time $d_i$ is the time needed to compute an intersection of topics between the given service 110 and another service 110. Upon determining, D for the given service 110, the given interlock 120 can select a member, $d_i$ in the set of D with the largest time as the grace period, $GP_i$. Moreover, in some examples, the given interlock 120 can add a tolerance delay, Δ to the grace period $GP_i$.

To demonstrate the calculation of the set of services, S, consider a first example (hereinafter, "the first example"). In the first example, it is presumed that service (Q,K) is offline, and every other service 110 (namely services (1,1) . . . (Q,K−1)) is presumed to be online. As noted, there are R number of topics communicated by the services 110 on the mesh network. In such a situation, the Qth interlock 120 can employ Equation 2 to define a variable, S that represents the set of services 110 that are currently online in the first example (prior to service (Q,K) coming online).

$$S = \{\text{Service}(1,1) \ldots \text{Service}(N, K-1)\} \quad \text{Equation 2:}$$

Wherein:

n is the total number of possible Services on the mesh network; and

|S|=n−1, such that n−1 is the Cardinality (a number of elements) of S.

Continuing with the first example, the Qth interlock 120 can employ Equation 3 to determine, $M_n$ for service (Q,K), which defines the set of topics (of the R number of topics) needed for service (Q,K) to communicate with the services S (defined in Equation 1). As noted above, service (Q,K) can alternatively be refer to as $\text{service}_n$.

$$M_n = T_S \cap T_n \quad \text{Equation 3:}$$

Wherein:

$T_S$ is the topic subset 114 that the corresponding services S (defined in Equation 1) communicates on; and $T_n$ is the topic subset 114 that the corresponding $\text{service}_n$ communicates on.

Continuing with the first example, the Qth interlock 120 can calculate $D_n$ for $\text{service}_n$ (service (Q,K)), which is the times needed to compute each intersection, indicated as $T_i \cap T_n$ in Equation 3. More particularly, the Qth interlock 120 can calculate $D_n$ with Equation 4.

$$D_n = \{d_1, d_2 \ldots d_{n-1}\} \quad \text{Equation 4:}$$

Wherein:

$d_i$ is the computational time needed to calculate $T_i \cap T_n$ and $d_i \propto \text{ordinal}(T_i \cap T_n)$, indicating that $d_i$ is proportional to the number of topics in common between $\text{service}_i$ and $\text{service}_n$.

In the first example, the Qth interlock 120 can select the element $d_i$ in the set $D_n$ that has a greatest value. Additionally, in some examples, the Qth interlock 120 can add a tolerance delay, Δ to the $GP_n$. In other examples, the tolerance delay, Δ may not be added or may be equal to 0. Thus, the Qth interlock 120 can employ Equation 5 to determine the grace period, $GP_n$ for the $\text{service}_n$ (service (Q,K)).

$$GP_n = \max(D_n) + \Delta \quad \text{Equation 5:}$$

Wherein:

Δ is the tolerance delay and is set to 0 in examples where the tolerance delay is not employed.

The given interlock 120 can record a set of computational times for computing an intersection of topics in common between the given service 110 and another service 110 in the mesh network. Thus, in some examples, the grace period for a current startup sequence calculated by the given interlock 120 can be based on a recorded timing of operations during a previous startup sequence. Stated differently, the given interlock 120 can employ Equations 1-5 (or similar variants) to calculate the grace period for the given service 110 for the current startup sequence based on computational times and topic intersections observed during the previous startup sequence. The addition of the tolerance delay allows for new topics that were previously unaccounted for during the current startup sequence to come online. The grace period can be any length of time. However, in some examples, the grace period for a service 110 will be one second or less.

Employment of the grace period can curtail lost or resent messages. For instance, during a given startup sequence, it is presumed that during a first initialization sequence, service (1,1) comes online after service (2,K). Additionally, it is presumed that the topic subset (2,K) (the topic subset of service (2,K) and topic subset (1,1) (the topic subset of service (1,1)) both include topic 4 of the R number of topics. Without using a grace period, in such a situation, if the service (2,K) publishes messages to topic 4 prior to service (1,1) coming online, service (1,1) would not receive the published messages. Thus, those messages would need to be resent or those messages would be lost. However, the implementation of a grace period can curtail such lost or resent messages.

To illustrate possibilities for leveraging a grace period, examples are provided illustrating different operational states of the computing platform 104. More particularly, FIGS. 2A-2D illustrates stages of a startup sequence of the computing platform 104 of FIG. 1 in a second example (hereinafter "second example") that employ a grace period for services 110. For purposes of simplification of explanation, the same reference numbers are employed in FIGS. 1 and 2A-2D to denote the same structure.

Figure 2A:
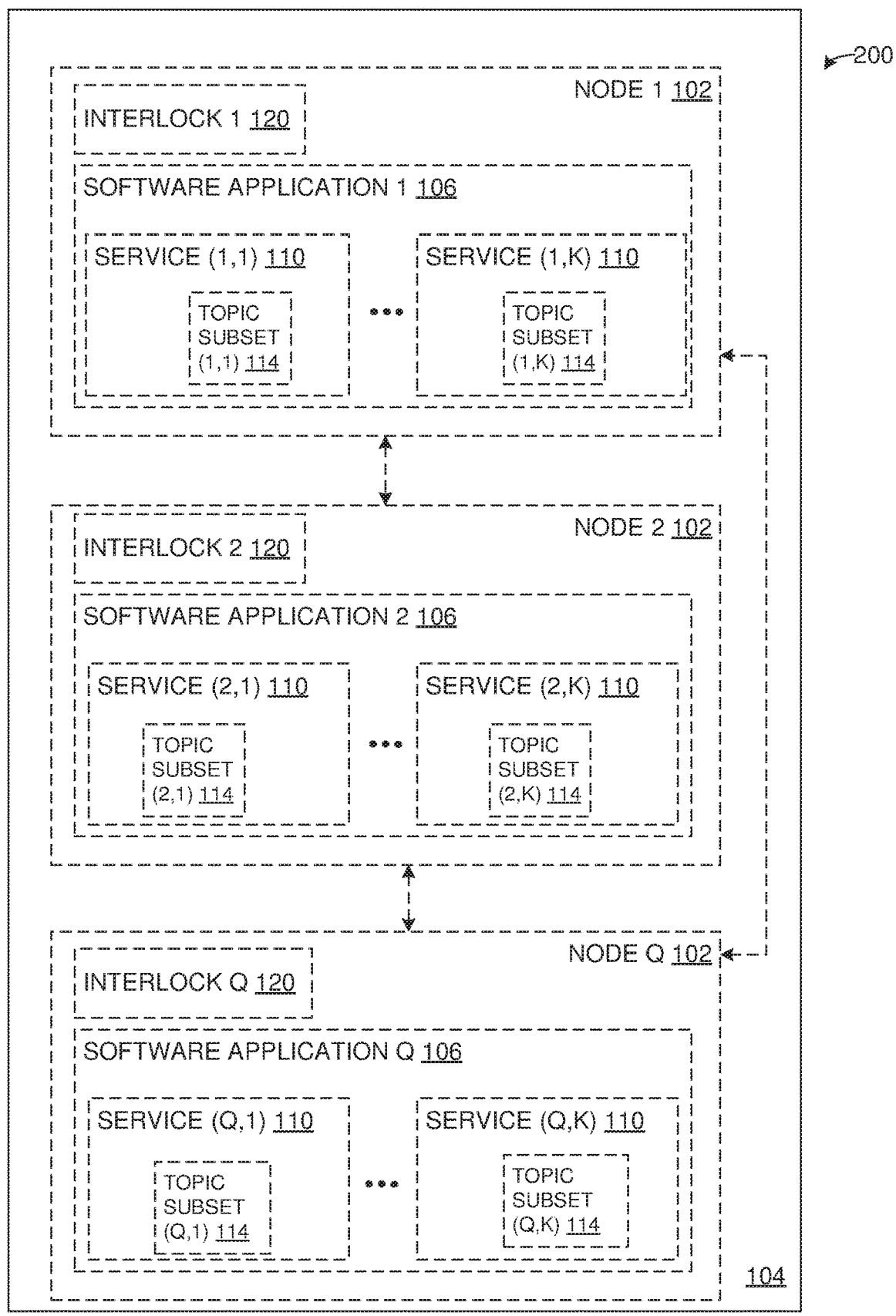
FIGS. 2A-2D illustrate an example of stages of a startup sequence for controlling services on a mesh network.

FIG. 2A illustrates a first stage 200 of the startup sequence for the second example. In the first stage 200 each of the Q number of nodes 102 on the computing platform 104 are offline. Thus, in the first stage 200, none of the services 110 communicate.

Figure 2B:
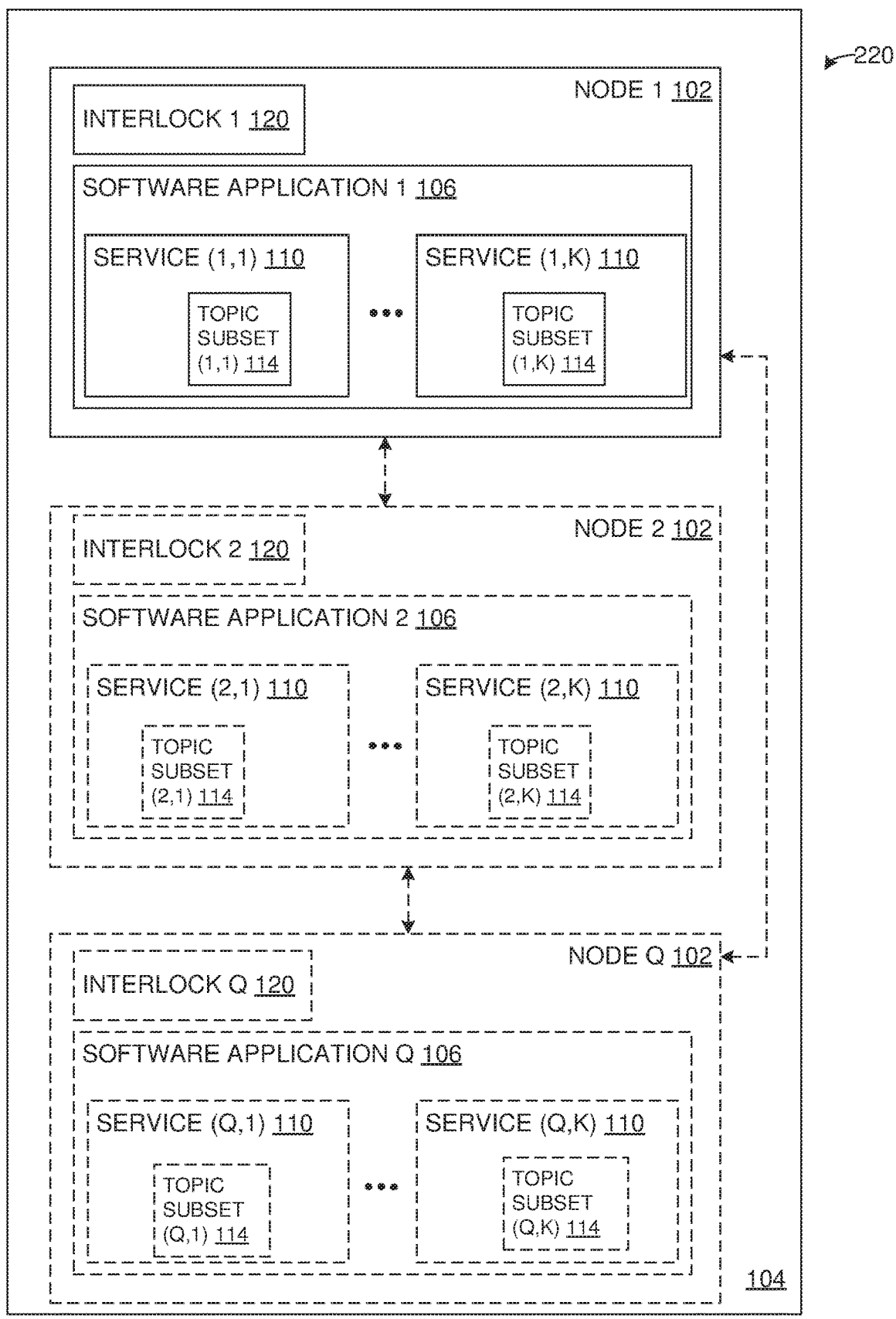

FIG. 2B illustrates a second stage 220 of the startup sequence for the second example. In the second stage 220 of the second example, it is presumed that the first node 102 and the associated software components, namely, the first interlock 120, the first software application 106 and the services (1,1) . . . (1,K) of the first software application 106 have also come online. In the second stage 220, the first interlock 120 calculates a grace period for each of the services (1,1) . . . (1,K) operating on the first node 102 in the manner described. Additionally, in the second stage 220, each of the K number of services 110 coming online is a network event detectable by the first interlock 120 that triggers a running of the respective grace period. For example, the first interlock 120 starts (resets) the grace period for the services (1,1) . . . (1,K) coming online. During the running of the associated grace period, the first interlock 120 prevents the associated service 110 from communicating messages on the mesh network.

Figure 2C:
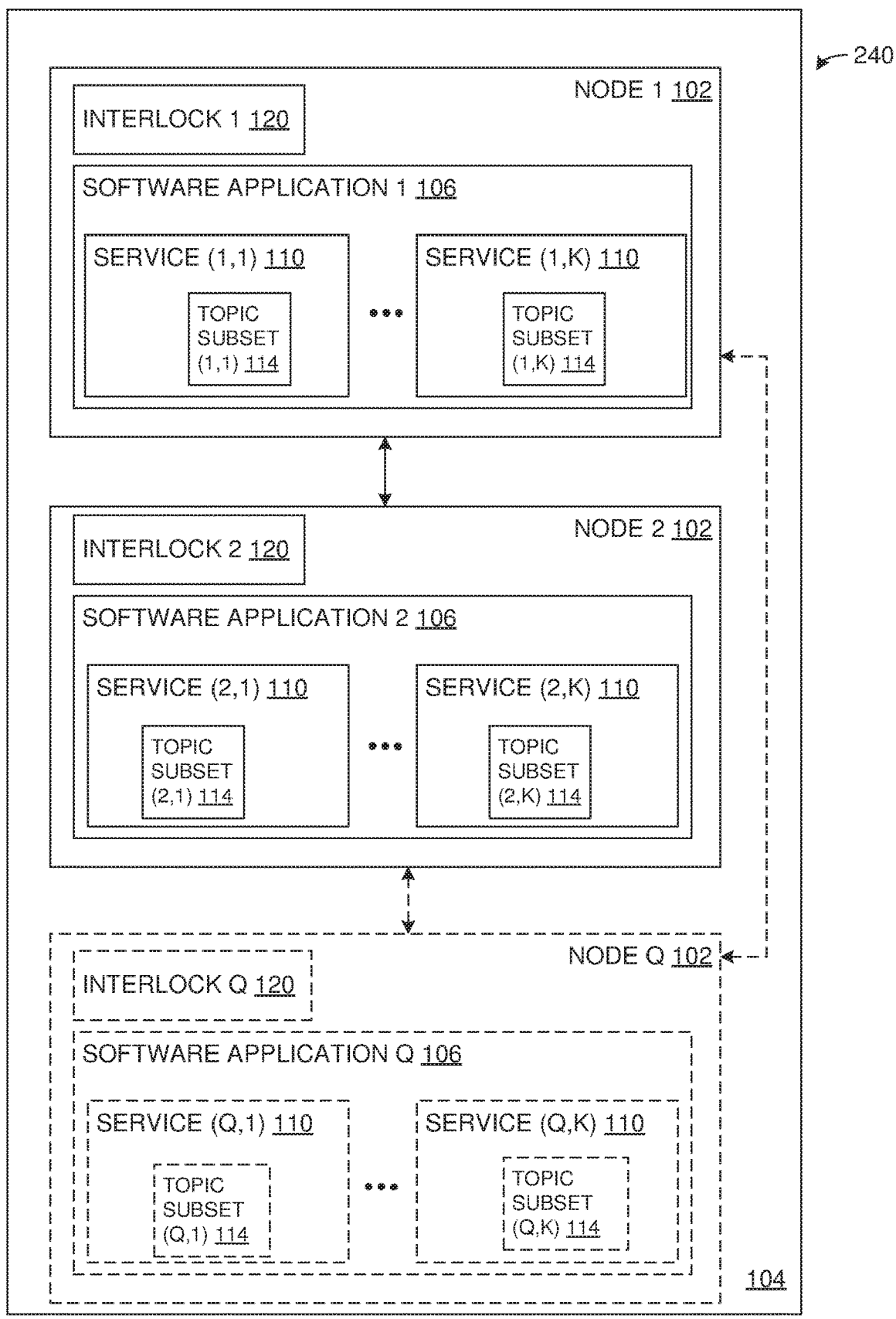

Continuing with the second example, during the grace period for each of the services (1,1) . . . (1,K), it is presumed that node 2 comes online, as illustrated in FIG. 2C. More particularly, FIG. 2C illustrates a third stage 240 of the startup sequence of the second example. Similar to the second stage 200 of the second example, in the third stage 240, the second interlock 120, the second software application 106 and the services (2,1) . . . (2,K) of the second software application 106 have also come online.

In the third stage 240, the second interlock 120 calculates a grace period for each of the services (2,1) . . . (2,K) operating on the second node 102 in the manner described. Additionally, in the third stage 240, each of the services (2,1) . . . (2,K) coming online is a network event detectable by the second interlock 120 that causes the second interlock 120 to trigger a running of the respective grace period. Furthermore, the first interlock 120 of the first node 102 detects the services (2,1) . . . (2,K) coming online as network events that trigger a reset of the respective grace periods. In response, the first interlock 120 resets the grace period for each of the services (1,1) . . . (1,K) of the first software application 106. Stated differently, in the second example, each interlock 120 is configured to reset the grace period for a service 110 in response to detecting another service 110 coming online. Thus, in the third stage 240 of the second example, it is presumed that the grace period for services (1,1) . . . (1,K) and services (2,1) . . . (2,K) is running.

Figure 2D:
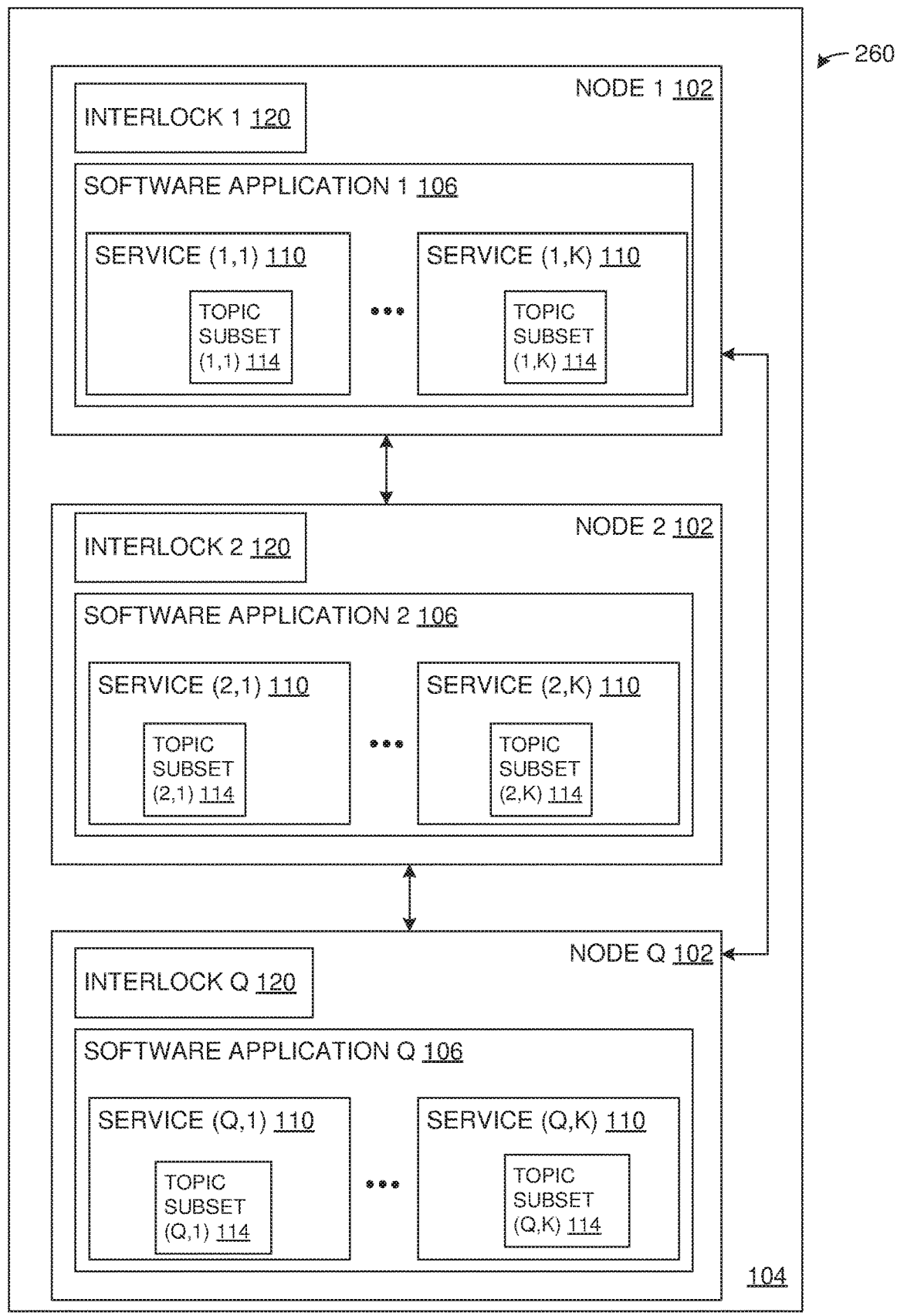

Continuing with the second example, during the grace period for each of the services (1,1) . . . (1,K) and services (2,1) . . . (2,K), it is presumed that Qth node 102 comes online, as illustrated in FIG. 2D. More particularly, FIG. 2D illustrates a fourth stage 260 of the startup sequence of the second example. Similar to the second stage 220 and the third stage 240, in the fourth stage 260, the Qth interlock 120, the Qth software application 106 and the services (Q,1) . . . (Q,K) of the Qth software application 106 have also come online.

In the fourth stage 260, the Qth interlock 120 calculates a grace period for each of the services (Q,1) . . . (Q,K) operating on the second node 102 in the manner described. Additionally, in the fourth stage 260, each of the services (Q,1) . . . (Q,K) coming online is detected by the Qth interlock 120 as a network event that triggers a running of the respective grace period. Furthermore, the first interlock 120 of the first node 102 and the second interlock 120 of the second node 102 detects the services (Q,1) . . . (Q,K) coming online as network events that trigger a reset of the respective grace periods. In response, the first interlock 120 resets the grace period for each of the services (1,1) . . . (1,K) of the first software application 106 and the second interlock 120 resets the grace period for each of the services (2,K). As noted, in the second example, each interlock 120 is configured to reset the grace period for a service 110 in response to detecting another service 110 coming online. Thus, in the fourth stage 260 of the second example, it is presumed that the grace period for services (1,1) . . . (1,K), services (2,1) . . . (2,K) and services (Q,1) . . . (Q,K) is running.

When the grace period expires for each associated service 110, the associated service 110 can communicate (e.g., publish) messages on the mesh network. More particularly, the first interlock 120 can permit the services (1,1) . . . (1,K) to communicate on the mesh network as associated grace periods expire. Additionally, the second interlock 120 can permit the services (2,1) . . . (2,K) to communicate on the mesh network as associated grace periods expire and the Qth interlock 110 can permit the services (Q,1) . . . (Q,K) to communicate on the mesh network.

As demonstrated in the second example, the Q number of interlocks 120, operate in concert to ensure that each service 110 waits the grace period before communicating messages on the mesh network. This delay afforded by the grace period allows for a non-deterministic startup order of the Q number of nodes 102, software applications 106 and associated services 110. Instead, each time a (previously offline) service 110 comes online, the grace period for each online service 110 is reset, and each online service 110 delays further communication of messages until the associated grace period has expired.

Figure 3A:
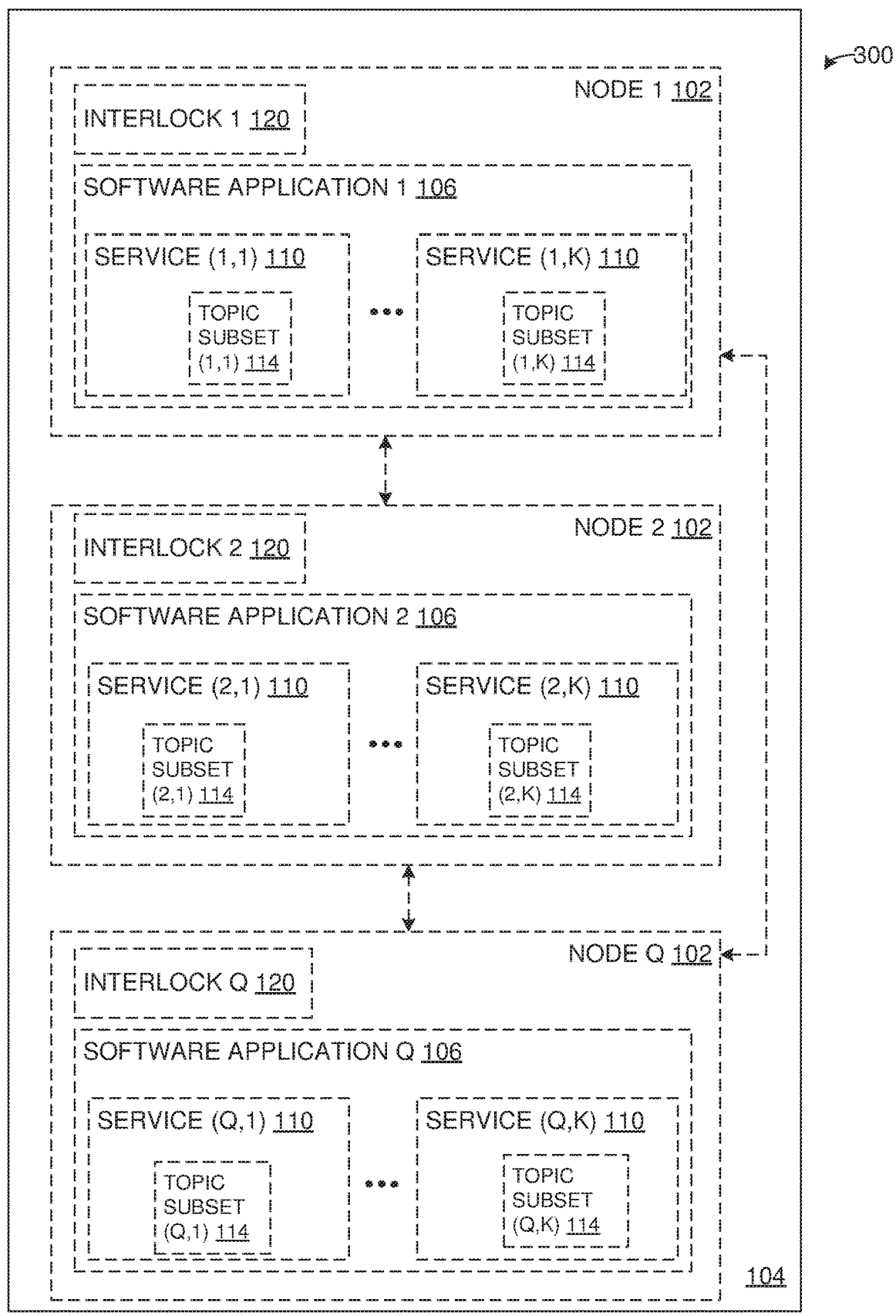
FIGS. 3A-3D illustrate another example of stages of a startup sequence for controlling services on a mesh network.

FIGS. 3A-2D illustrates stages of a startup sequence of the computing platform 104 of FIG. 1 in a third example (hereinafter "third example") that employ a grace period for services 110. For purposes of simplification of explanation, the same reference numbers are employed in FIGS. 1 and 3A-3D to denote the same structure.

FIG. 3A illustrates a first stage 300 of the startup sequence for the third example. In the first stage 300 each of the Q number of nodes 102 on the computing platform 104 are offline. Thus, in the first stage 300, none of the services 110 communicate.

Figure 3B:
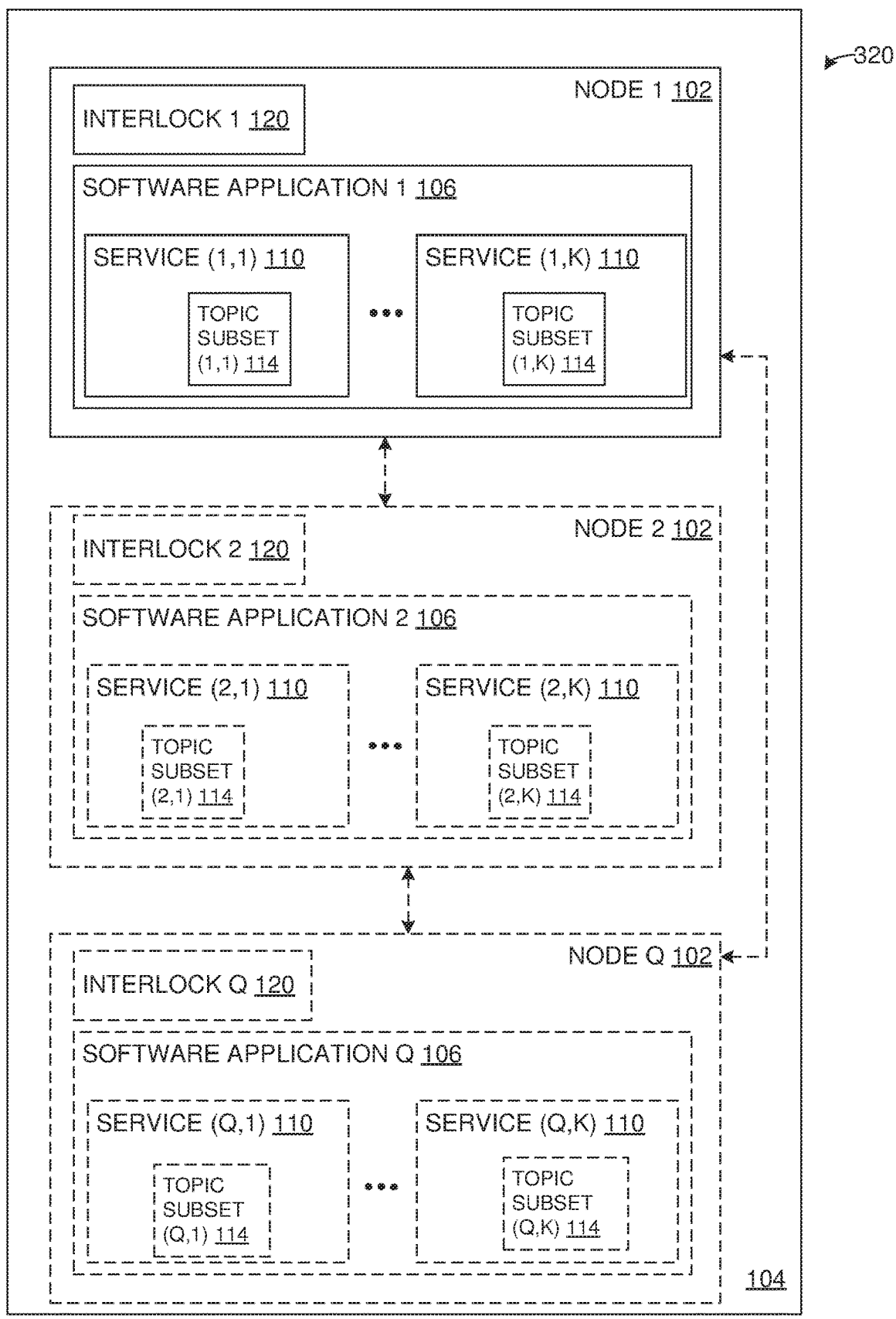

FIG. 3B illustrates a second stage 320 of the startup sequence for the third example. In the second stage 320 of the third example, it is presumed that the first node 102 and the associated software components, namely, the first interlock 120, the first software application 106 and the services (1,1) . . . (1,K) of the first software application 106 have also come online. In the second stage 320, the first interlock 120 calculates a grace period for the services (1,1) . . . (1,K) operating on the first node 102 in the manner described. Additionally, in the second stage 320, each of the K number of services 110 coming online is a network event detectable by the first interlock 120 that triggers a reset (and running) of the respective grace period. For example, the first interlock 120 starts (resets) the grace period for the service (1,1) to the service (1,K) coming online. During the running of the associated grace period, the first interlock 120 prevents the associated service 110 from communicating messages on the mesh network.

Figure 3C:
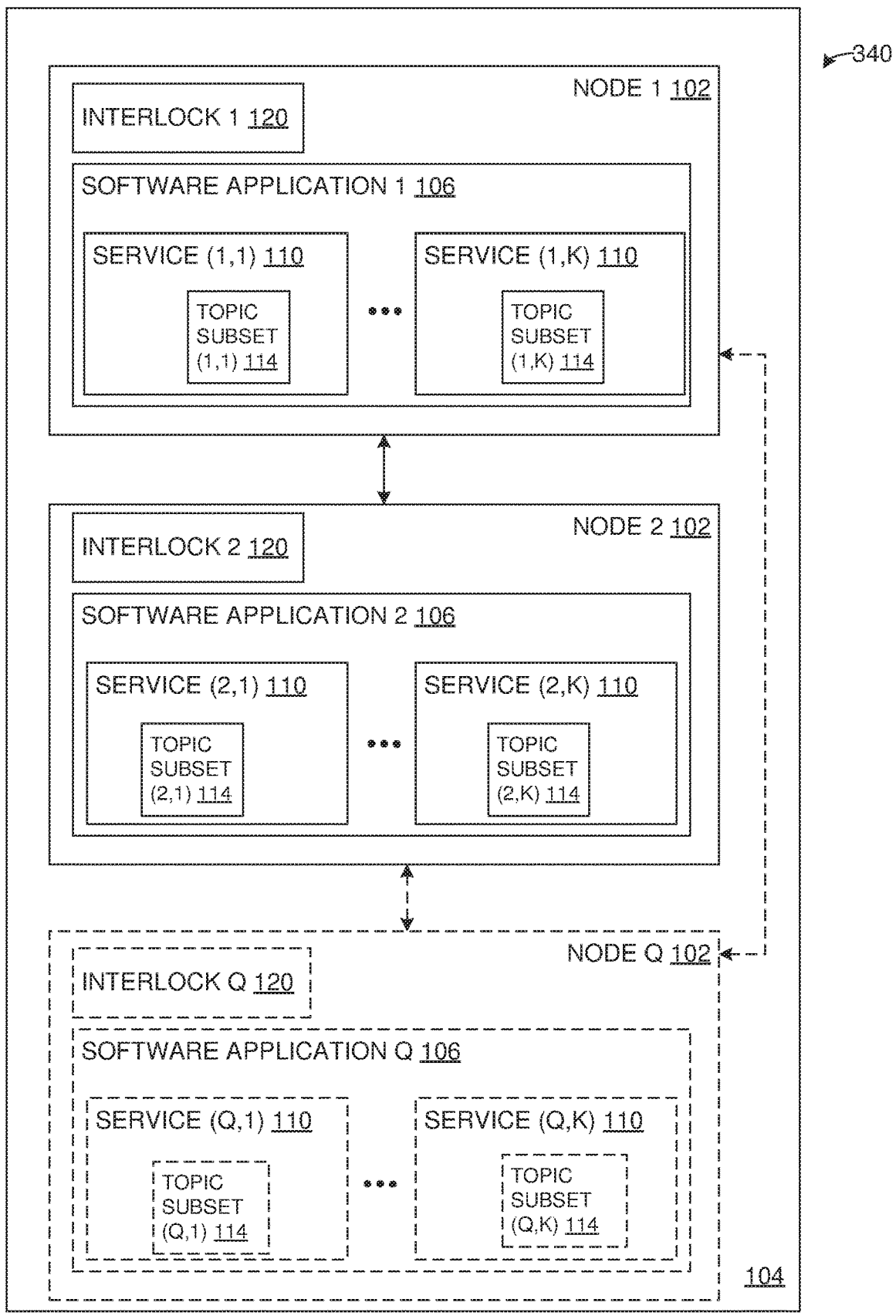

Continuing with the third example, during the grace period for each of the services (1,1) . . . (1,K), it is presumed that the second node 102 comes online, as illustrated in FIG. 3C. More particularly, FIG. 3C illustrates a third stage 340 of the startup sequence of the second example. Similar to the second stage 320, in the third stage 340, the second interlock 120, the second software application 106 and the services (2,1) . . . (2,K) of the second software application 106 have also come online.

In the third stage 340, the second interlock 120 calculates a grace period for the services (2,1) . . . (2,K) operating on the second node 102 in the manner described. Additionally, in the third stage 240, each of the services (2,1) . . . (2,K) coming online is a network event detectable by the second interlock 120 that triggers a reset and running of the respective grace period. Furthermore, the grace period of services (2,1) . . . (2,K) continues to run. Stated differently, in contrast to the second example, in the third example, the first interlock 120 does not reset the grace period in response to detecting a service 110 coming online. Instead, in the third example, the grace period starts and runs for a respective service 110 when that respective service 110 comes online. Moreover, in the third stage 340 of the second example, it is presumed that the grace period for services (1,1) . . . (1,K) and services (2,1) . . . (2,K) is running.

Figure 3D:
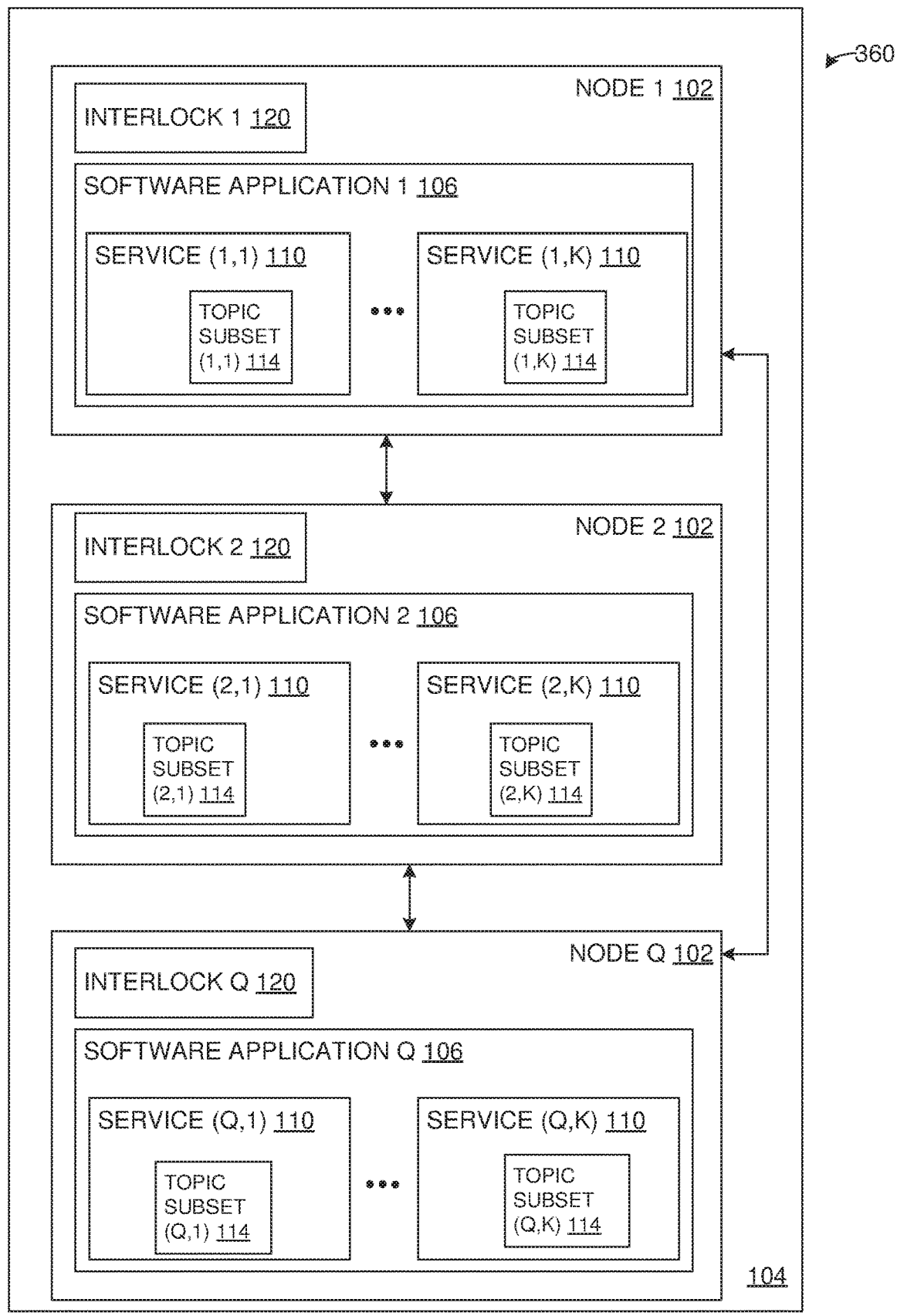

Continuing with the third example, during the grace period for each of the services (1,1) . . . (1,K) and services (2,1) . . . (2,K), it is presumed that the Qth node 102 comes online, as illustrated in FIG. 3D. More particularly, FIG. 3D illustrates a fourth stage 360 of the startup sequence of the second example. Similar to the second stage 320 and the third stage 340, in the fourth stage 360, the Qth interlock 120, the Qth software application 106 and the services (Q,1) . . . (Q,K) of the second software application 106 have also come online.

In the fourth stage 360, the Qth interlock 120 calculates a grace period for the services (Q,1) . . . (Q,K) operating on the second node 102 in the manner described. Additionally, in the fourth stage 360, each of the services (Q,1) . . . (Q,K) coming online is a network event detectable by the Qth interlock 120 that triggers a reset and running of the respective grace period. Furthermore, in the third example, it is presumed the grace period started by the first interlock 120 for the services (1,1) . . . (1,K) expire prior to the expiration of the grace periods for services (2,1) . . . (2,K) and services (Q,1) . . . (Q,K). Thus, in the second example, the services (1,1) . . . (1,K) can communicate messages on the mesh network before expiration of the grace period for services (2,1) . . . (2,K) and (Q,1) . . . (Q,K). Additionally, in the third example, it is presumed that the grace period for services (2,1) . . . (2,K) expire before the grace period of services (Q,1) . . . (Q,K) (and after services (1,1) . . . (1,K)), such that the services (2,1) . . . (2,K) can communicate messages before the expiration of the grace period for services (Q,1) . . . (Q,K). Finally, in the third example, it is presumed that the grace period for services (Q,1,) . . . (Q,K) expire after the grace periods expire for services (1,1) . . . (1,K) and services (2,1) . . . (2,K). As demonstrated in the third example, the Q number of interlocks 120, operate to ensure each service 110 waits the associated grace period before communicating messages on the mesh network. This delay afforded by the grace period allows for a non-deterministic startup order of the Q number of nodes 102, the Q number of software applications 106 and the respective services 110.

Referring back to FIG. 1, as noted, in the second example, a previously offline service 110 coming online is a network event detectable by the interlocks 120 that triggers a reset and running of the grace period for each online service 110. In contrast, in the third example, the grace period is not reset in response to an interlock 120 of a different node 102 detecting a previously offline service 110 coming online. Thus, relative to the second example, the third example allows earlier communication of messages on the mesh network. In contrast, the second example has a lower probability of having a message communicated on the mesh network before every receiving (subscribing) service 110 has come online. The specific operations of the interlock 120 can be selected based on the number and type of software applications 106 and/or services 110 operating on the computing platform 104.

As noted, the grace period implemented by the interlocks 120 allow the nodes 102, the respective software applications 106 and/or the services 110 to come online in a non-deterministic order. However, the grace period implemented by the interlocks 120 would also provide benefits in an instance of the system 100 wherein the nodes 102, the respective software applications 106 and the services 110 to come online in a deterministic (predictable) order. More particularly, employment of the grace periods obviates the need for including artificial delays in software during a deterministic startup order for the nodes 102, the respective software applications 106 and/or the services 110.

Additionally, the grace period can be leveraged as a remedial operation in response to an unexpected shutdown of a node 102, a service 110 and/or a software application 106. For instance, bugs in a given node 102, a given software application 106 or a given service 110 may cause an unexpected crash, thereby temporarily disabling the corresponding services 110. Additionally, in a situation where the computing platform 104 is operating on a fighter aircraft, it is possible that a node 102, a software application 106 and/or service 110 may unexpectedly go offline due to damage to the aircraft (e.g., in a hardware failure). In any such situation, the Q number of interlocks 120 can be configured to reset the grace period for each associated service in response to detecting a previous online service 110 going offline.

More particularly, FIGS. 4A-4D illustrates stages of remedial operations executed by interlocks 120 in response to an unexpected loss of communication with particular services 110 in a fourth example (hereinafter, "fourth example"). For purposes of simplification of explanation, the same reference numbers are employed in FIGS. 1 and 4A-4D to denote the same structure.

Figure 4A:
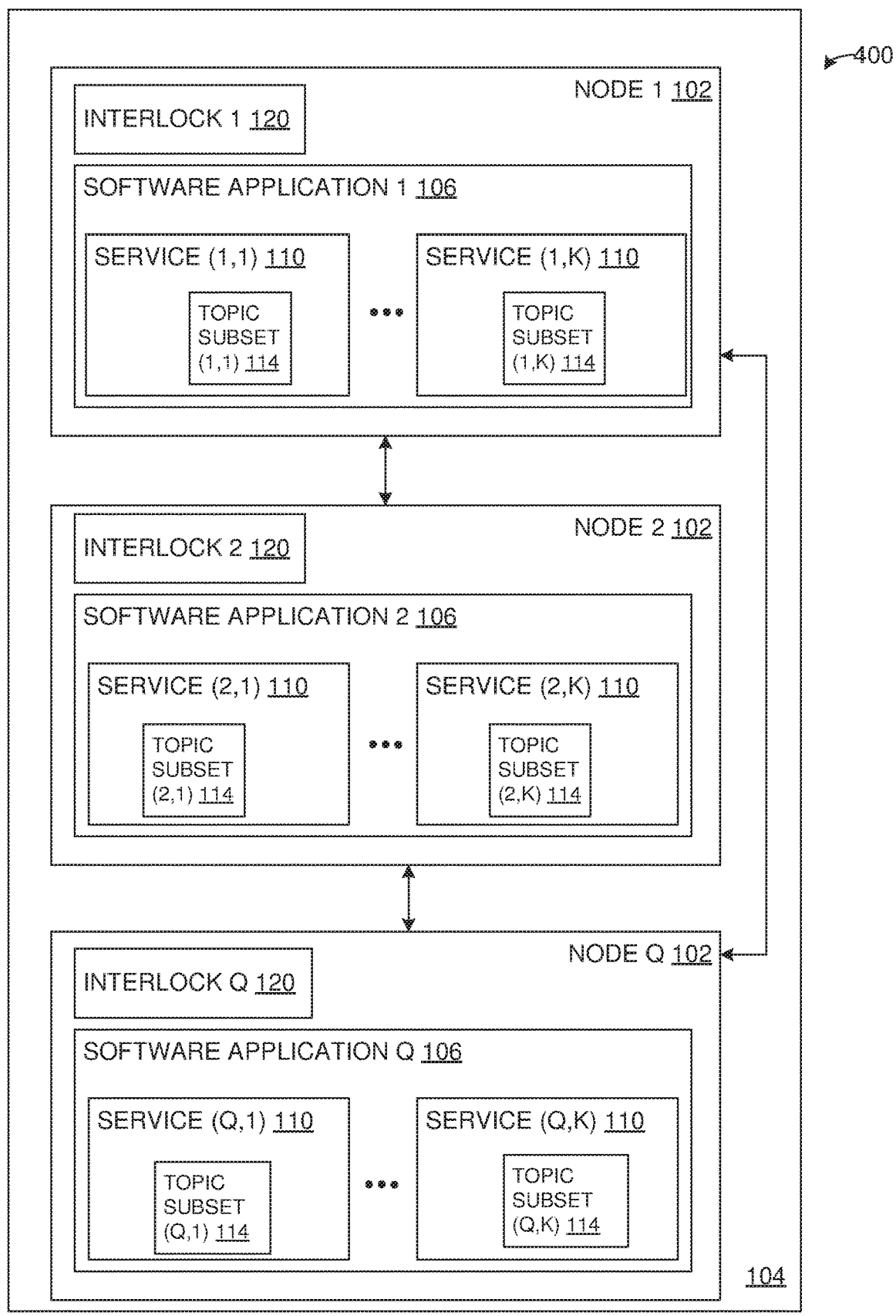
FIGS. 4A-4D illustrate stages of remedial operations for controlling services on a mesh network.

FIG. 4A illustrates a first stage 400 of the remedial operations for the fourth example. In the first stage 400 each of the Q number of nodes 102 on the computing platform 104 are online. Thus, in the first stage 400, each of the services 110 operating on the Q number of software applications communicate on a mesh network.

Figure 4B:
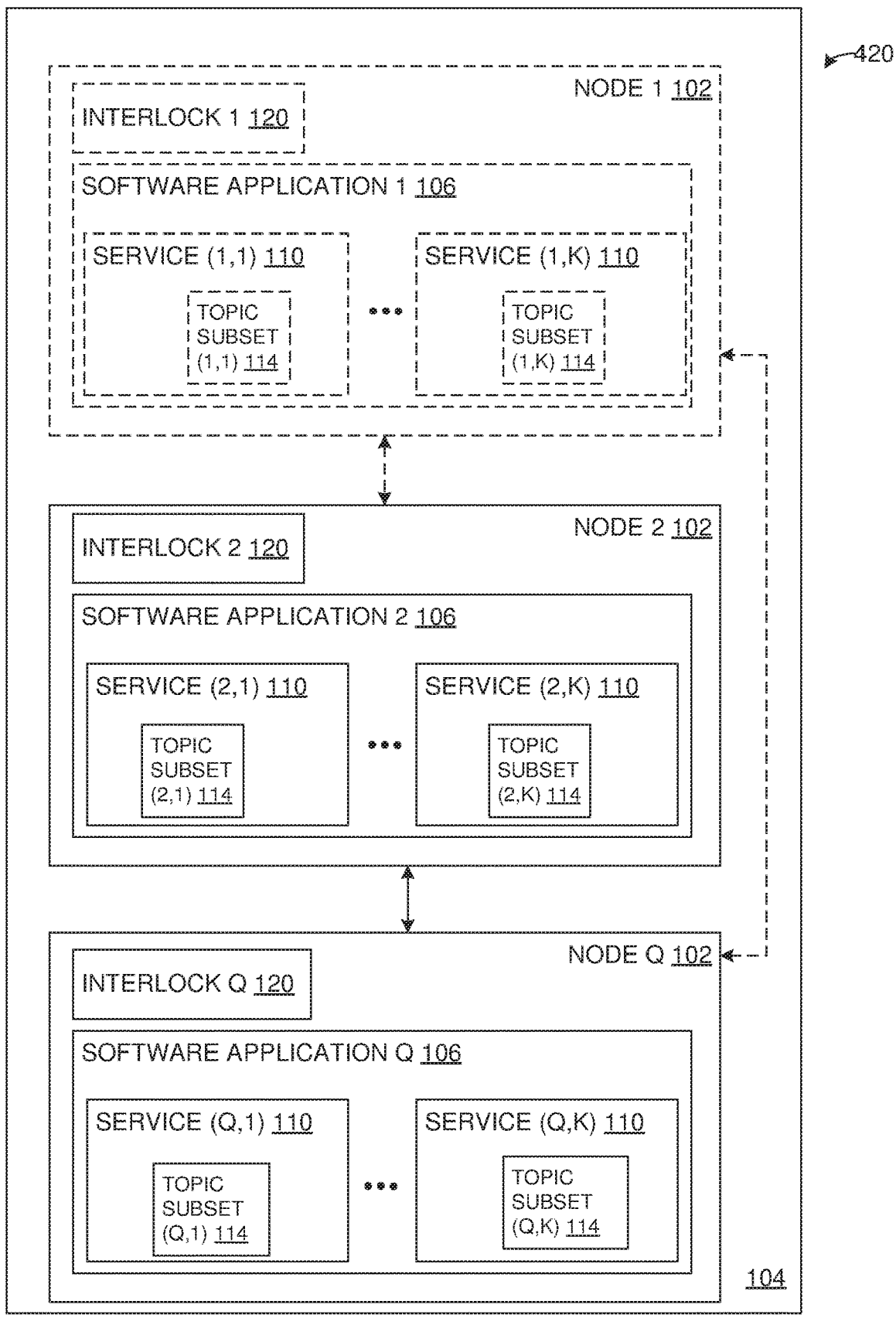

FIG. 4B illustrates a second stage 420 of the fourth example wherein the first node 102 unexpectedly goes offline, thereby causing the first interlock 120, the first software application 106 and the services (1,1) . . . (1,K) to go offline as well. In the fourth example, the second interlock 120 of the second node 102 and the Qth interlock 120 of the Qth node 102 detect one or more of the services (1,1) . . . (1,K) going offline as network events that trigger the reset and running of respective grace periods. In response, the second interlock 120 resets (and runs) the grace period for services (2,1) . . . (2,K) preventing the services (2,1) . . . (2,K) from communicating on the mesh network until the associated grace periods have expired. Similarly, in response to detecting one or more of the services (1,1) . . . (1,K) going offline, the Qth interlock 120 resets and runs the grace period for services (Q,1) . . . (Q,K) preventing the services (Q,1) . . . (Q,K) from communicating on the mesh network until the associated grace periods have expired.

Figure 4C:
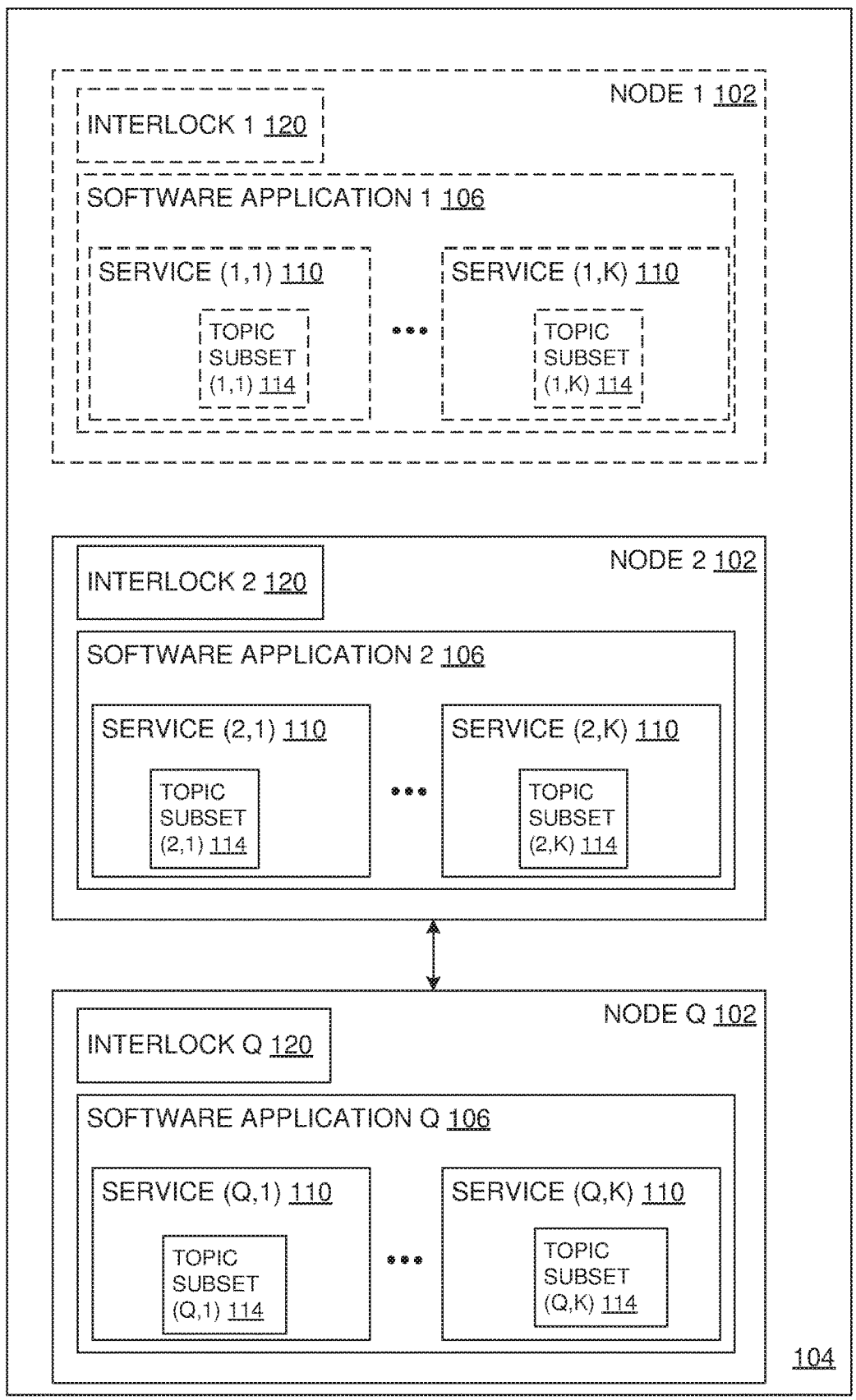

In a first instance of the fourth example, it is presumed that the first node 102 does not come online prior to expiration of the grace period for services (2,1) . . . (2,K) and services (Q,1,) . . . (Q,K). Thus, FIG. 4C illustrates a third stage of the fourth example where in the grace periods for the services (2,1) . . . (2,K) and services (Q,1) . . . (Q,K) has expired, but the first node 102 has not come back online. Additionally, in the third stage, the services (2,1) . . . (2,K) and the services (Q,1) . . . (Q,K) can communicate on the mesh network. In the third stage 440 of the fourth example, communications between the first node 102 and the other nodes (the second node 102 and the Qth node 102) have been severed. The third stage 440 could occur, for example, as a result of a hardware failure (e.g., damage to an aircraft).

Figure 4D:
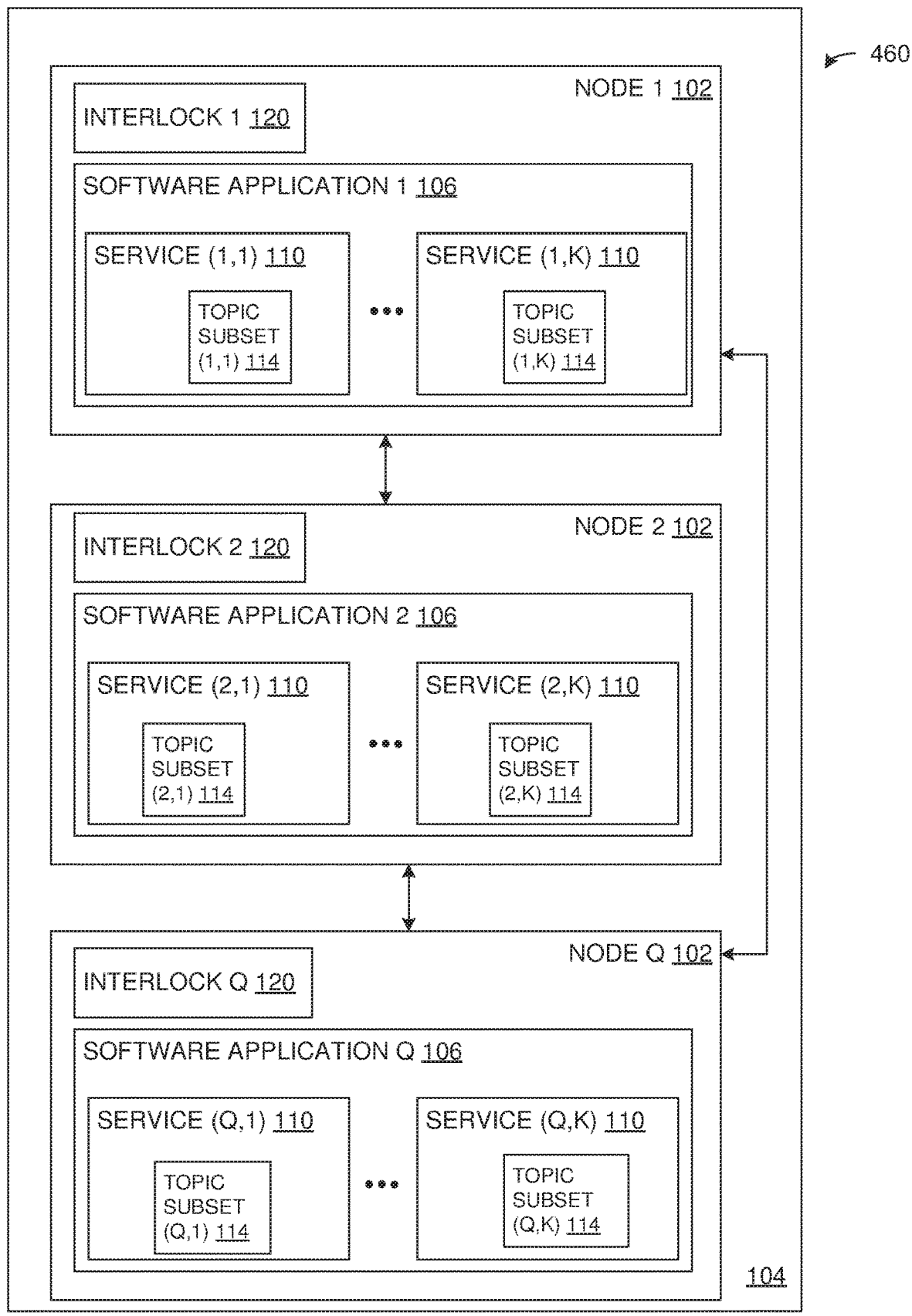

Alternatively, the fourth example can transition from the second stage 420 to a fourth stage 460 (rather than the third stage 440), as illustrated in FIG. 4D. In the fourth stage 460, the first node 102 and associated components have come back online before expiration of the grace periods of the services (2,1) . . . (2,K) and services (Q,1) . . . (Q,K). In these situations, the first interlock 120 can reset the grace period for services (1,1) . . . (1,K). Additionally, prior to expiration of the grace period for services (1,1) . . . (1,K) for the first node 102, the grace period for services (2,1) . . . (2,K) and services (Q,1) . . . (Q,K) expire. Thus, in the fourth example, services (2,1) . . . (2,K) and services (Q,1) . . . (Q,K) can communicate on the mesh network before the services (1,1,) can communicate on the mesh network. After the grace period for the services (1,1) . . . (1,K) expire, the services (1,1) . . . (1,K) can resume communicating messages on the mesh network. In this manner, message loss during the time period that the first node 102 is offline is curtailed.

Referring back to FIG. 1, as demonstrated in the fourth example, the interlocks 120 can employ the grace periods to execute remedial operations to curtail message loss during an unexpected software and/or hardware failure at a node 102, a software application 106 and/or a service 110.

As described, inclusion of the interlocks 120 affords a time period, the aforementioned grace period, for the services 110 of the system 100 to come online (or come back online) before communicating (e.g., publishing) messages on the mesh network. In this manner, during a startup sequence or during remedial operations, the interlocks 120 curtail unnecessary message loss and/or the resending of messages.

Figure 5:
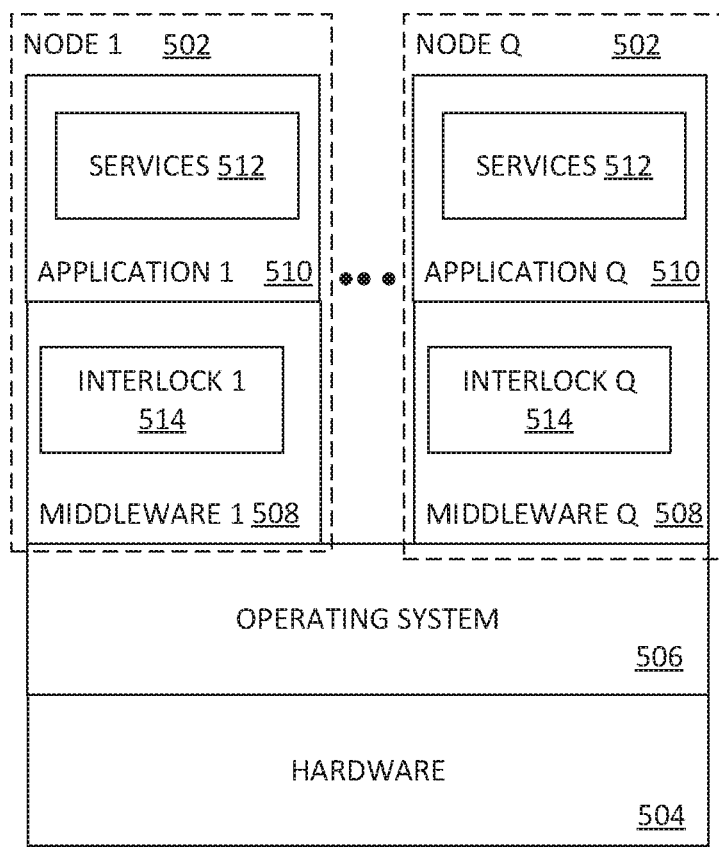
FIG. 5 illustrates an example of a computing platform that can support a node of a mesh network.

FIG. 5 illustrates an example of a computing platform 500 that can be employed to implement an instance of the computing platform 104 of FIG. 1 to support Q number of nodes 502, where Q is an integer greater than or equal to one, such as the nodes 102 of FIGS. 1, 2A-2D, 3A-3D and 4A-4D. The computing platform 500 includes hardware 504. In some examples, the hardware 504 includes a non-transitory memory (e.g., volatile memory and/or non-volatile memory) for storing machine readable instructions and a processing unit (e.g., one or more processor cores) for accessing the memory and executing the machine-readable instructions. In some examples, the memory can be implemented as a hard disk drive, a solid-state drive, flash memory, random access memory, or any combination thereof. In other examples, the hardware 504 can include a microcontroller with instructions embedded therein. Further, in other examples, the hardware 504 includes an application specific integrated circuit (ASIC) chip. The hardware 504 can also include an interface for communicating with other computing platforms, such as an Ethernet interface, a Wi-Fi interface, a Bluetooth interface, etc.

The computing platform 500 can include an operating system 506 that executes on the hardware 504. The operating system 506 can manage the hardware 504 and software resources and can provide common services for computer programs. Further, Q number of instances of a middleware 508 (e.g., application software) can execute on the operating system 506. Each of the Q number of instances of middleware 508 can be implemented on a corresponding node 502. The middleware 508 can facilitate communication between Q number of software applications 510, wherein each node 502 includes an application. More particularly, each instance of middleware 508 can direct network communications (e.g., TCP and/or UDP packets) from one application 510 to another via services 512, including situations where the two such applications are executing on separate computing platforms. Further, each middleware 508 can include an interlock 514 that can selectively implement grace periods for services 512 that can prevent such services 512 from communicating on the mesh network until such grace periods have expired. In some examples, the Q number of instances of middleware 508 can provide an isolated runtime environment for the corresponding application 510.

Figure 6:
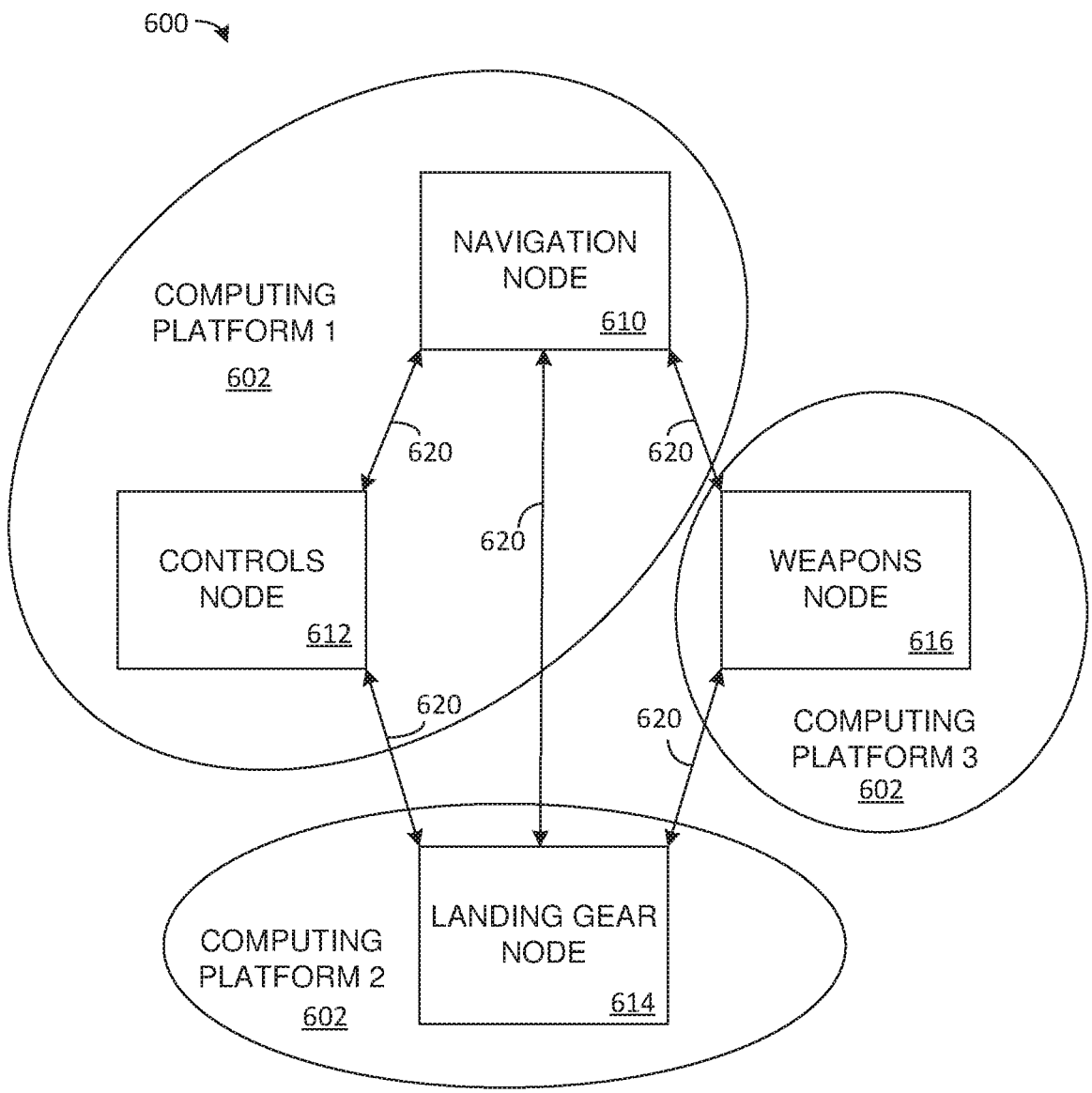
FIG. 6 illustrates an example of a system with a plurality of computing platforms for a plurality of nodes operating on an aircraft.

FIG. 6 illustrates an example of a system 600 that could be employed to implement the system 100 of FIG. 1. Moreover, the system 600 includes three (3) computing platforms 602. Each computing platform 602 can be representative of an instance of the computing platform 500 of FIG. 5. The system 600 is provided as an example of software that could execute on a combat rated aircraft.

The system 600 includes nodes executing on each of the computing platforms 602. Each node could be representative of an instance of a node 102 of FIG. 1, 2A-2D, 3A-3D and/or 4A-4D. In the example illustrated in FIG. 4, computing platform 1 includes a navigation node 610 and a controls node 612. The navigation node 610 can include, for example, software for controlling a navigation system of the aircraft. The controls node 612 can represent software for pilot controls of the aircraft.

Computing platform 2 can include, for example, a landing gear node 614 that can be representative of software for controlling landing gear of the aircraft. Further, computing platform 3 can include a weapons node 616 for controlling operations of weapons systems for the aircraft. Each of the navigation node 610, the controls node 612, the landing gear node 614 and the weapons node 616 can be brought online or offline in a non-deterministic manner, as described herein. Moreover, as illustrated, a bi-directional communication links 620 (which can represent two one-way communication links) connect each node in the system 600 to every other node in the system 600 via services. The resultant mesh network of the system 600 is serverless, such that the system 600 does not have a single point of failure.

Figure 7:
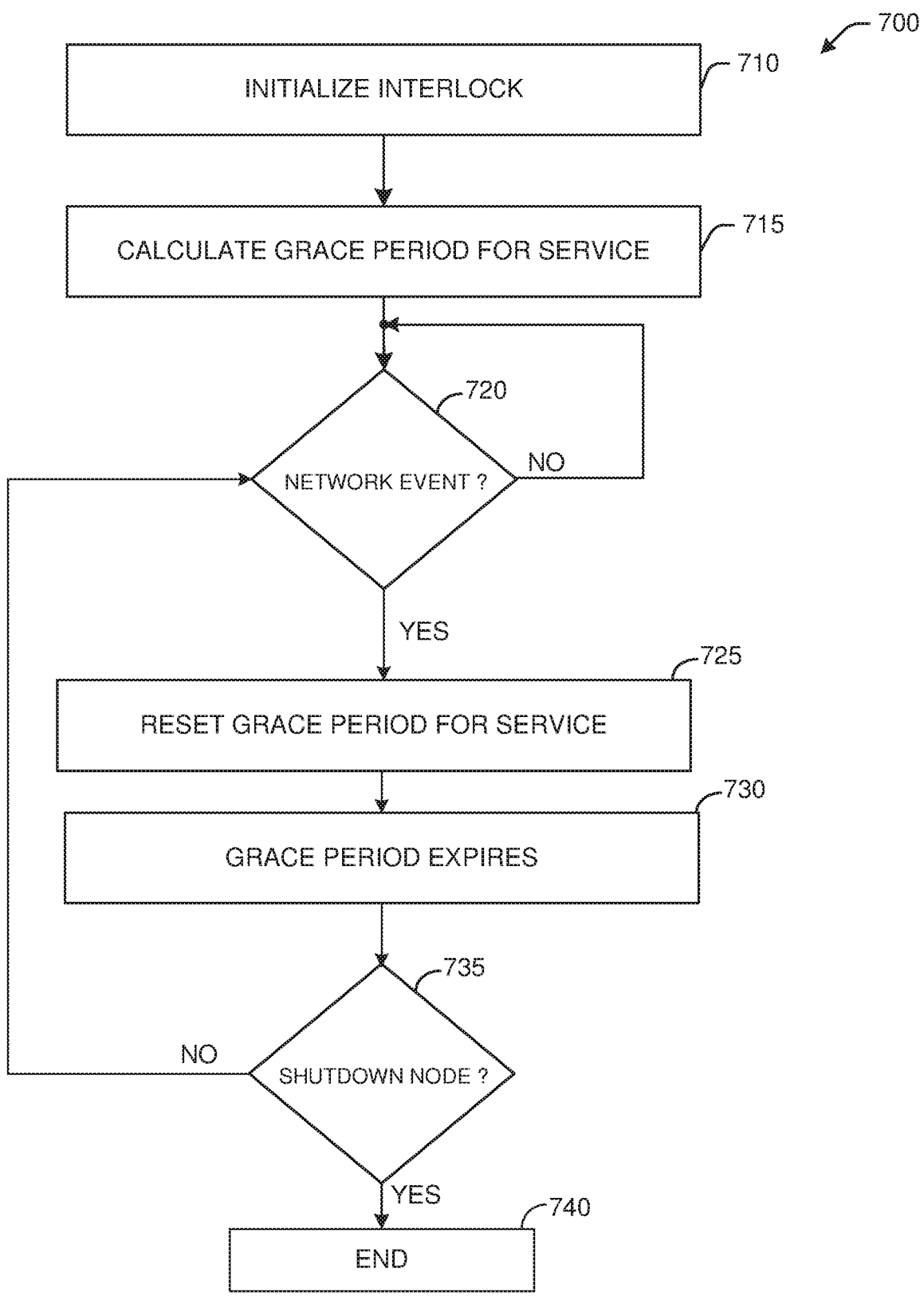
FIG. 7 illustrates an example of a method for implementing a grace period for a service on a mesh network.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates an example of a method 700 for implementing a grace period for services of a mesh network. The method 700 can be executed, for example, by an interlock (e.g., the interlock 120 of FIG. 1) executing on a given node (e.g., one of the Q number of nodes 102 of FIG. 1).

At 710, the interlock is initialized on the given node, such that the interlock is brought online. At 715, the interlock calculates a grace period for a given service (e.g., a service 110 of FIG. 1) of a given software application (e.g., the software application 106 of FIG. 1) executing on the given node.

At 720, the interlock makes a determination as to whether a particular network event that would trigger a reset and running of the grace period has been detected. The network event could be, for example, detecting that the given service has come online. Additionally or alternatively, the network event could be detecting that another service has come online or has gone offline. If the determination at 720 is positive (e.g., YES), the method 700 proceeds to 725. If the determination at 720 is negative (e.g., NO), the method 700 returns to 720, such that the interlock waits for the network event.

At 725, the interlock resets the grace period for the given service, such that the grace period runs. During running of the grace period, the given service is prevented from communicating (e.g., publishing) messages on the mesh network. At 730, the grace period expires. Expiration of the grace period causes the interlock to permit the given service to communicate messages on the mesh network.

At 735, a determination is made by the interlock as to whether the given node is to shut down. If the determination at 735 is negative (e.g., NO), the method returns to 720, wherein the interlock waits for the next particular network event. If the determination at 735 is positive (e.g., YES), the method 700 proceeds to 740, wherein the method 700 ends.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for establishing a mesh network comprising:
a plurality of nodes of the mesh network, wherein each of the plurality of nodes executes on one or more computing platforms comprising a non-transitory memory for storing machine readable instructions and a processing unit for accessing the non-transitory memory and executing the machine readable instructions, wherein, in response to coming online, each of the plurality of nodes executes an interlock that:
calculates a grace period for a service executed by a respective software application executing on a respective node of the plurality of nodes, wherein the calculation is based on a previous number of services and topics communicated on the mesh network during a prior execution of the service executed by the respective software application;
resets the grace period in response to detecting a particular network event wherein the interlock prevents the service of the respective software application from communicating messages on the mesh network during a running of the grace period; and
permits, in response to expiration of the grace period, the service of the respective software application to communicate messages on the mesh network.

2. The system of claim 1, wherein at least two of the plurality of nodes come online in a non-deterministic order.

3. The system of claim 1, wherein the software application executing on a respective node publishes messages on the mesh network.

4. The system of claim 3, wherein each node communicates via the Transmission Control Protocol (TCP).

5. The system of claim 1, wherein the interlock of a respective node of the plurality of nodes resets the grace period in response to detecting a software application of the respective node coming online.

6. The system of claim 1, wherein the interlock of a respective node of the plurality of nodes resets the grace period in response to detecting the service coming online.

7. The system of claim 1, wherein the service is a given service and the interlock of a respective node of the plurality of nodes resets the grace period in response to detecting another service going offline.

8. The system of claim 1, wherein the service is a given service and the interlock of a respective node of the plurality of nodes resets the grace period in response to detecting another service of the respective node or another node of the plurality of nodes coming online or going offline.

9. The system of claim 1, wherein the service is a given service and the calculating is based on a recorded computational time for an intersection of topics in common between the given service of a respective software application and another service of a respective software application.

10. The system of claim 1, wherein the calculating further comprises:
recording a set of computational times for computing an intersection of topics in common between a given service of a respective software application of a respective node and topics of each other service in the mesh network; and
selecting from the set of computational times, a greatest computational time for the grace period.

11. The system of claim 10, wherein the calculating further comprises adding a tolerance delay to the grace period.

12. The system of claim 11, wherein a first node of the plurality of nodes comprises a navigation system, and a second node of the plurality of nodes comprises a weapons system.

13. A computing platform comprising:
a non-transitory memory for storing machine readable instructions; and
a processing unit for accessing the non-transitory memory and executing the machine readable instructions, the machine readable instructions comprising:
a given node of a plurality of nodes executing on the computing platform wherein the given node communicates on a mesh network, and in response to coming online, the given node executes an interlock that:
calculates a grace period for a given service of a given software application executing on the given node, wherein the calculation is based on a previous number of services and topics that the given service communicated with on the mesh network during a prior execution of the given service executed by the given software application;
resets the grace period in response to detecting a particular network event wherein the interlock prevents a service of the given software application from communicating messages on the mesh network during the grace period; and
permits, in response to expiration of the grace period, the service of the respective software application to communicate messages on the mesh network.

14. The computing platform of claim 13, wherein at least two of the plurality of nodes are initiated in a non-deterministic order.

15. The computing platform of claim 13, wherein the interlock of a given node resets the grace period in response to detecting a given service of the given software application coming online.

16. The computing platform of claim 13, wherein the interlock of the given node resets the grace period in response to detecting another service of a software application of another node of the plurality of nodes coming online or going offline.

17. The computing platform of claim 13, wherein the calculating further comprises adding a tolerance delay to the grace period.

18. The computing platform of claim 13, wherein the calculating is based on a recorded computational time for an intersection of topics in common between the given service and topics of other services in the mesh network.

19. A method for establishing a mesh network comprising:
initiating, at a given node of a mesh network, execution of an interlock; calculating, by the interlock, a grace period for a given service of a software application executing on the given node, wherein the calculating is based on a number of services and topics that communicate on the mesh network;
detecting, at the interlock of the first node, a particular network event on the mesh network;
resetting, at the interlock of the first node, the grace period in response to the detecting;

preventing, by the interlock of the first node, the given service of the software application from communicating on the mesh network in response to the resetting; and permitting, by the interlock of the first node, the service of the software application to communicate on the mesh network in response to expiration of the grace period.

20. The method of claim 19, wherein the particular network event corresponds to a detection that the given service comes online or another service on another node of the mesh network one of comes online or goes offline.

* * * * *